July 19, 1932.  O. V. KRUSE  1,868,147
VALVE
Filed Jan. 6, 1927   2 Sheets-Sheet 2
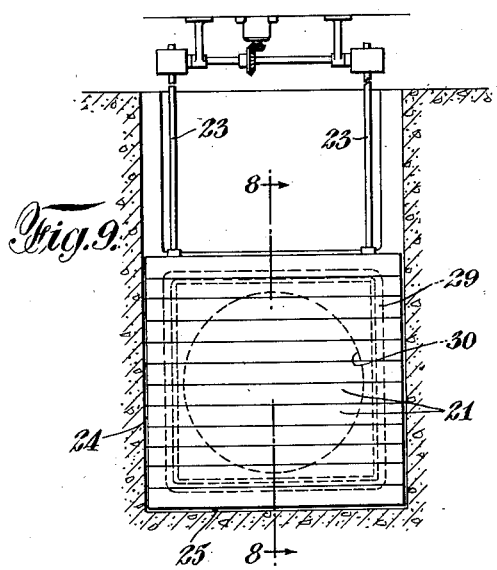
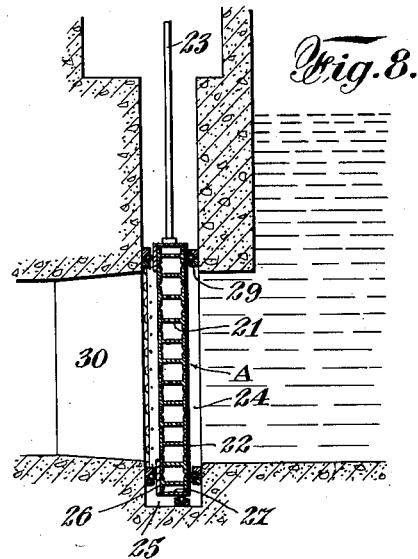
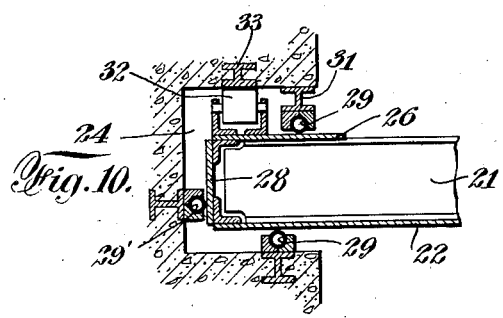
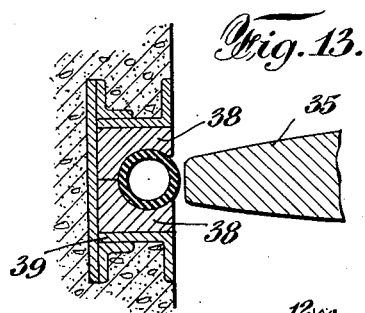
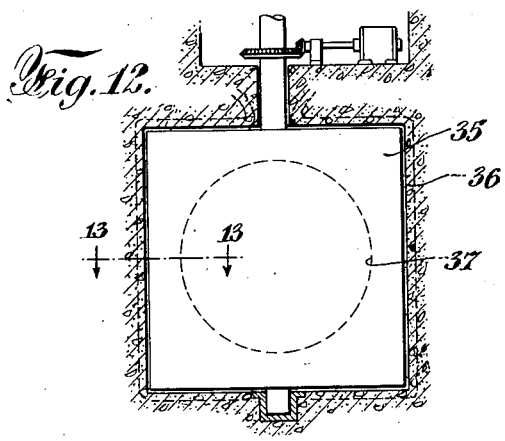
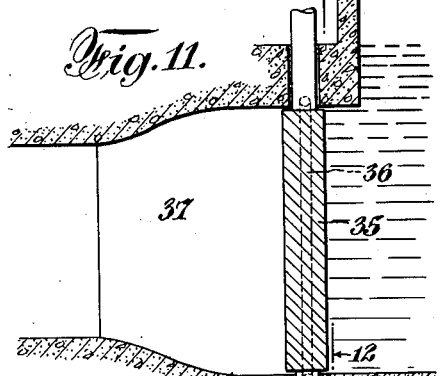

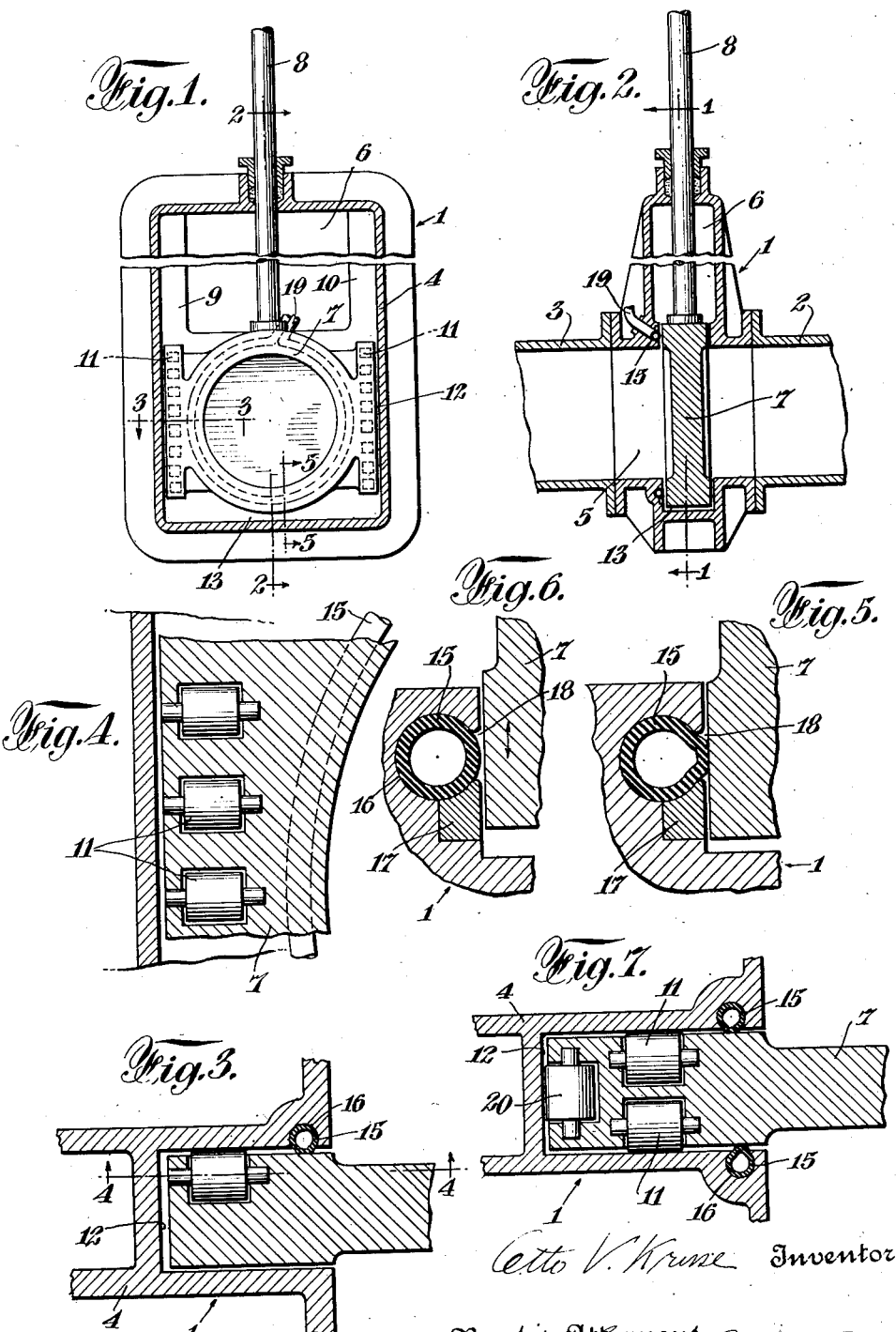

Patented July 19, 1932

1,868,147

UNITED STATES PATENT OFFICE

OTTO V. KRUSE, OF ST. DAVIDS, PENNSYLVANIA, ASSIGNOR TO I. P. MORRIS AND DE LA VERGNE, INC., A CORPORATION OF DELAWARE

VALVE

Application filed January 6, 1927. Serial No. 159,292.

This invention relates to valve mechanisms and more particularly to gate valves, head gates and the like.

An object of my invention is to provide in the above types of valves suitable means for sealing the movable valve member and casing and to provide sealing means adapted not only to have a relatively large sealing area, but also to conform readily to surface irregularities of the movable valve member or casing, depending upon which one serves as the seat.

More specifically, an object is to provide a non-metallic flexible sealing member, and to have the same engage a plane surface of the movable valve member, in case the sealing means is carried by the conduit casing, or vice versa.

A further object is to provide an improved combination of elements, whereby both leakage and excessive friction may be overcome.

Further objects and advantages of my invention will appear from the following description of the accompanying drawings, in which:—

Fig. 1 is a transverse vertical section taken substantially on the line 1—1 of Fig. 2, but showing the movable valve member in elevation;

Fig. 2 is a section on line 2—2 of Fig. 1;

Fig. 3 is a section on line 3—3 of Fig. 1;

Fig. 4 is a section approximately on line 4—4 of Fig. 3;

Figs. 5 and 6 are fragmentary sections of a modified valve without rollers and which sections are taken on a line corresponding to line 5—5 of Fig. 1, and show respectively the sealing member in its sealing and unsealed positions;

Fig. 7 is a fragmentary horizontal section of a modified sealing and guiding arrangement;

Fig. 8 is a vertical section of a head gate taken on the line 8—8 of Fig. 9;

Fig. 9 is a transverse section showing the head gate in elevation on its upstream side, as indicated by the arrow A in Fig. 8;

Fig. 10 is a fragmentary horizontal section showing part of the head gate and the sealing and guiding means therefor;

Fig. 11 is a vertical longitudinal section through a pivotal head gate which is shown in closed position;

Fig. 12 is a vertical transverse section on line 12—12 of Fig. 11; and

Fig. 13 is a transverse section on line 13—13 of Fig. 12.

In valves of the type herein disclosed, difficulty has heretofore been had due to the fact that the valve member is directly slidably supported on a bearing surface provided by the stationary casing. The valve when in closed position has considerable pressure acting thereon and accordingly a large amount of friction is created between the surfaces during valve movement. This has the disadvantage of consuming considerable power, although there is the advantage in such types of valves that the pressure effects a tight seal when the valve is in closed position, provided that the cooperating surfaces are true. However, if the surfaces are not true, which may be due to warping of the casing or valve, or other causes, the pressure will offer no advantage in sealing. Hence there will result not only the disadvantage due to friction, but also to leakage.

The prior attempts to overcome leakage created by warping or the like have not satisfactorily solved the problem of overcoming both leakage and friction in a single valve. The provision of certain prior art means and arrangements to overcome the frictional problem is of such a nature as to leave the leakage problem in an unsatisfactory condition. These prior devices are of such a nature that generally the solution of one problem worked contrary to the solution of the other. Devices which might be employed to reduce friction would create a space between the valve elements, and through which leakage would occur; whereas, on the other hand, means to prevent leakage have been involved with arrangements whereby friction had to be contended with during valve movement.

To overcome in a single valve both friction and leakage, I employ in one aspect of my invention a combination including anti-friction means disposed between the movable valve parts, and which necessitates, in order that such means may operate efficiently, that the relatively movable surfaces of the valve parts must be spaced apart sufficiently to avoid excessive sliding or frictional contact between said surfaces. This spacing would ordinarily permit appreciable leakage, and would accordingly heretofore have been considered very detrimental, except that I take advantage of this space to permit suitable expansible and contractible sealing means to operate therein for sealing the valve mechanism.

In a further specific aspect of the invention, cooperation between the anti-friction means and sealing means is brought about through the ability to transfer the reaction force for the upstream pressure from the sealing means to the anti-friction means or vice versa, in accordance with the open or closed position of the valve. Hence, when the valve is closed and sealed, pressure on the anti-friction means may be fully relieved or substantially reduced, and there will be detrimental effect upon the anti-friction means, which could take place if the valve were left in closed position for an extended period of time with full pressure on the anti-friction means. Thus the sealing means for this particular phase of my invention can perform, in combination with anti-friction means, the dual function of closing any space necessary to permit efficient operation of said means and of relieving pressure thereon, these results being in addition to other results hereinafter or before mentioned.

Referring to the drawings, a gate valve, generally indicated 1, is interposed between up and downstream pipes 2 and 3 respectively. The gate valve comprises a main frame 4 having a fluid opening 5, preferably circular, communicating with a chamber 6 into which a valve member 7 may be linearly moved as by any suitable mechanism including an actuating rod 8. To support the valve 7 during its movement, and to permit actuation thereof with minimum effort, there are provided guideways 9 and 10 extending vertically and over which runs a series of rollers 11 carried by the downstream side of valve 7. These rollers, as shown in Fig. 4, are journalled upon pins extending through suitable roller receiving recesses, although if desired a roller supporting unit could be used, consisting of a channel iron and having the rollers journalled therein, this unit then being merely attached to the face of the valve, such a construction being later described.

As shown in Figs. 3 and 7, the roller bearing surfaces are disposed within recesses 12 extending vertically, while a generally horizontal recess 13 is provided at the bottom of the valve casing, these recesses receiving the edge portions of the movable valve member. The rollers, as shown in Fig. 3 and others, normally require the surfaces of the valve member and casing to be spaced apart thereby eliminating sliding friction. However, this permits considerable leakage, so I have provided in combination therewith sealing means for closing this space after the valve is in its closed position, which sealing means is preferably fluid pressure controlled and adapted for release when the valve is being moved.

The sealing means constitutes preferably a non-metallic expansible member herein specifically shown in the form of a tube 15, this tube being received in a suitable recess 16 which is preferably circular and surrounds generally the opening 5. The main body portion of valve 7 is also circular, as shown in Fig. 1, so as to provide a circular plane surface with which the tube 15 may cooperate. The tube may be held in position in any suitable manner, such, for instance, as by providing a circular keeper ring 17 which, when removed, will permit removal of the tube, there being provided between the keeper ring and the casing an opening 18 through which the circular tube may expand, as shown in Fig. 5, into engagement with the face of valve 7. It is seen from these figures that the tube, when in its contracted position, is clear of the valve, so that during valve movement, the rollers will engage the bearing surfaces 9 and 10; whereas when the tube is expanded into its sealing position, the sealing pressure might be sufficient to slightly move the valve, and accordingly the rollers, away from the roller surfaces 9 and 10. In case the rollers are not used as shown in Figs 5 and 6, and with the tube in its contracted position, the sliding surfaces of the valve and casing would engage to permit suitable support for the valve during movement thereof; whereas in closed position, the valve would be sealed, and possibly the sliding surfaces would be slightly moved apart. In any case, however, fluid pressure is supplied to and exhausted from the tube by having the ends 19 thereof extend outwardly from the casing 1 and alternatively connectible to a suitable source of pressure fluid supply or exhaust.

In Fig. 7, sealing tubes are shown on both the up and down stream sides of the valve member, so as to take care of flow in either direction through the conduit. Rollers 11 are also disposed on each side of the valve, and there are, in addition, in case it should be desirable to use the same, lateral rollers 20. Each side of the valve member will be provided with such a set of rollers, as is the case with the single set of rollers shown in Fig. 1.

In Fig. 8, the principle of my invention is shown as applied to a head gate constituting, in its usual form, a series of I-beams 21 which are normally held together in fixed relation by a plate 22 on the upstream side. This gate is moved by any suitable mechanism, including a pair of vertical rods 23. The lateral edges of the gate are disposed in suitable side recesses 24, while a suitable bottom recess 25 is adapted to receive the lower edge of the gate when in closed position. The principle of my invention is used in connection with a gate of this type by providing on the downstream face adjacent the recesses a pair of vertical strips 26 and a horizontal strip 27, while the perimeter of the gate is likewise provided with a strip 28. The sealing means are here shown as three in number, but of course only one or two could be used, if desired. The sealing members 29, as shown in Fig. 9, are disposed in a rectangular form about the conduit 30. The sealing means is in the form of a tube, as shown in the previous constructions, and is supported in any suitable manner, such as upon I-beams 31 embedded within the masonry structure usually forming the conduit walls adjacent such a type of head gate. In order to permit the valve to be easily moved, a series of rollers 32 are disposed on each side of the valve 1 in a manner similar to that shown in Fig. 1, and these rollers are here shown as mounted in angle irons, or, if desired, channel irons, thereby forming a roller unit, the rollers bearing upon a suitable support 33 embedded in the masonry structure. The supply of actuating fluid for the tubes will be controlled in any suitable manner as previously described, the mode of operation being the same. Tube 29' extends only along the sides and bottom.

From the foregoing, it will be seen that my construction permits the use of anti-friction means, such as roller bearings or the like, without sacrificing a tight valve, for I have used, in combination therewith, my improved sealing arrangement which has a very definite cooperation with such an anti-friction device, in that the leakage space formed by such a device is positively closed when said valve is in its closed position; and when the valve is being moved, said sealing means is adapted to be moved away from contact with the valve, to permit the rollers to function completely in reducing the operating forces. Hence it is seen that the forces for resisting the upstream pressure can be alternately shifted from the sealing means to the rollers, or vice versa, in accordance with the valve operation.

It is also to be noted that the sealing means is engaged entirely at its side, thus necessitating only consideration of the circular cross-section of the tube, in distinction to those devices wherein the tube is engaged at its inner or outer sides, such as might be the case in a pivot valve, and wherein consideration must be given not only to the cross-sectional configuration of the tube, but also to the general curvature thereof. The tube herein disclosed is preferably made of heavy rubber, and as a result thereof can present varying degrees of sealing surface, depending upon the pressure within the tube, which is in distinction to those metallic sealing means wherein the sealing area is relatively fixed and cannot be appreciably varied, especially where the metallic sealing means follows an arcuate path around the valve surface, for in such a case the metal would tend to flex around two radii, one of which would be that of the transverse curvature of the metallic sealing means, and the other that of the general curvature of the sealing means around the valve surface. Under these conditions, upon attempting to expand the metal so as to obtain a variable sealing surface, the metal tends to buckle out of shape, which would cause even a worse sealing action than would be the case where only a fixed sealing area was relied on. Hence, in my device, the sealing area may be varied in accordance with the degree of upstream pressure, and will not, due to effecting this variable sealing area, become distorted or in any way tend to buckle so as to destroy the sealing effect. The same desirable effect could be obtained even though the sealing means were of different shape, or if, instead, the fluid receiving space were partly rigidly formed and the remainder were expansible and formed of non-metallic material. In any case, the non-metallic portion having properties such as being readily compressible and extensible, would permit the variable sealing area to be obtained.

In Figs. 11, 12 and 13, my invention, consisting in utilizing a straight surface for the flexible sealing means to engage, is shown in connection with a pivotal head gate 35 of the square type. The perimeter thereof has flat straight sides, as clearly shown in Fig. 12, with which a tubular sealing means 36 cooperates, this means being divided, if desired, into two sections, the free ends of which lead from the upper side of the pivot valve. The sealing means is preferably in the form of a rubber tube, such as shown in Fig. 13, and is held in the concrete structure forming the conduit 37 within which the pivot valve is disposed, by a pair of retaining members 38 removably disposed within suitable recesses formed around the perimeter of the valve by a suitable plate and angle iron construction 39. Any suitable means may be employed to rotate the valve, such as the motor and gearing arrangement shown in Fig. 12.

Thus it will be seen that there is present in this form of my invention, as in the others, the ability to obtain a variable sealing area, without the possibility of complications arising due to having several curvatures to contend with, it being noted that the tube will engage a flat surface, as in the other forms.

I claim:

1. In combination with a valve mechanism adapted to be interposed between up and down stream conduits and having a supporting structure and a linearly movable valve member associated therewith and adapted during movement and during existence of normal upstream pressure to control flow of fluid through said conduits, of anti-friction means associated with said structure and member to space adjacent surfaces of said member and structure, and means for preventing leakage through said space when the valve is in its closed position, said latter means comprising a fluid pressure expansible element movable into said space to relieve pressure upon the anti-friction means, said expansible element upon release of fluid pressure therein permitting relatively free valve movement on said anti-friction means.

2. In combination with a casing adapted to be interposed between up and down stream conduits and having a circular flow opening therethrough and a valve member movable transversely of said opening during existence of normal upstream pressure for controlling fluid-flow therethrough, bearing surfaces carried by said casing and disposed on each side of said opening and parallel to each other, and said valve member having a body portion for extending across said opening and provided with bearing supports for cooperation with said parallel bearing surfaces, of roller bearings carried by said bearing supports for engagement with said bearing surfaces to maintain said valve member and casing spaced apart at all times, and fluid expansible sealing means encircling said opening and interposed between the valve member and casing, whereby, when the valve member is in its closed position, the valve may be made leak-tight, irrespective of the space formed by said rollers and when the valve is to be moved, fluid pressure in said sealing means may be released to permit relatively free valve movement.

3. In combination with a casing adapted to be interposed between up and down stream conduits and having a circular flow opening therethrough and a valve member movable transversely of said opening during existence of normal upstream pressure for controlling fluid-flow therethrough, bearing surfaces carried by said casing and disposed on each side of said opening and parallel to each other, and said valve member having a body portion for extending across said opening and provided with bearing supports for cooperation with said parallel bearing surfaces, of roller bearings carried by said bearing supports for engagement with said bearing surfaces to maintain said valve member and casing spaced apart at all times, and fluid expansible sealing means encircling said opening and interposed between the valve member and casing, whereby, when the valve member is in its closed position, the valve may be made leak-tight, irrespective of the space formed by said rollers, said sealing means comprising a tubular member carried by said casing and adapted, upon expansion by fluid pressure, for engagement with the downstream face of said valve member and when the valve is to be moved fluid pressure in said sealing means may be released to permit relatively free valve movement.

4. In combination with a supporting structure adapted to be interposed between up and down stream fluid passages and having a flow opening, and a valve member movable transversely of said opening to control fluid flow therethrough, of releasable fluid pressure operated means for sealing said valve member and structure in a plurality of planes, one of which includes a transverse face of said valve member, and the other of which includes the perimeter thereof whereby upon release of said sealing pressure said valve is adapted to move substantially freely.

5. In combination with a supporting structure adapted to be interposed between up and down stream fluid passages and having a flow opening, and a valve member movable transversely of said opening for controlling fluid flow therethrough, of means for sealing said valve member and structure in a plurality of planes, one of which includes a transverse face of said valve member, and the other of which includes the perimeter thereof, and anti-friction means associated with said structure and valve member, whereby, upon release of the actuating fluid pressure for said sealing means, the forces in the direction of flow through said up and down stream passages are carried by said anti-friction means.

OTTO V. KRUSE.

CERTIFICATE OF CORRECTION.

Patent No. 1,868,147.                                    July 19, 1932.

OTTO V. KRUSE.

It is hereby certified that error appears in the printed specification of the above numbered patent requiring correction as follows: Page 2, line 23, after "be" insert the word "no"; and that the said Letters Patent should be read with this correction therein that the same may conform to the record of the case in the Patent Office.

Signed and sealed this 29th day of November, A. D. 1932.

M. J. Moore, (Seal)                                  Acting Commissioner of Patents.